March 13, 1945.  W. B. COLLIER  2,371,283
PULLEY
Filed Oct. 31, 1942
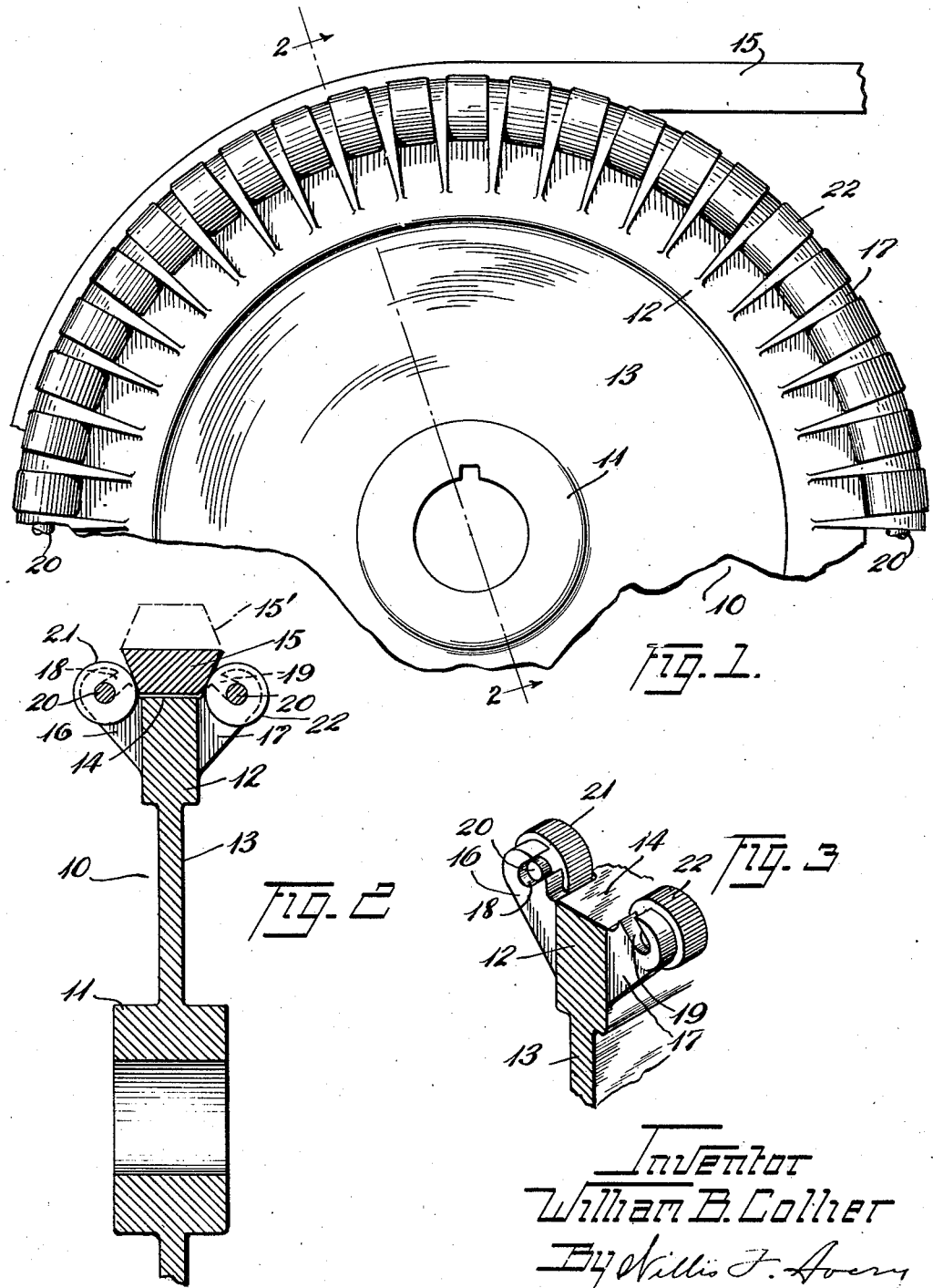
Inventor
William B. Collier
By Willis F. Avery
Atty Patented Mar. 13, 1945

2,371,283

UNITED STATES PATENT OFFICE 2,371,283

PULLEY

William B. Collier, Tallmadge, Ohio, assignor to The B. F. Goodrich Company, New York, N. Y., a corporation of New York Application October 31, 1942, Serial No. 464,065

6 Claims. (Cl. 74—230.5)

This invention relates to pulleys and is useful especially in the construction of pulleys for guiding or in driving engagement with side-driving belts for transmission of power.

In the transmission of power by the use of side-driving belts such as V-belts, considerable power losses are experienced due to friction of the sides of the grooved pulley of prior constructions with the belt as the belt is progressively seated in or unseated from the driving groove provided therefor in the pulley. This friction also causes wear of the belt. Where belts are of uncovered rubber construction, or where belt dressings are employed such seating friction is exceptionally high and often results in the belt turning with respect to its direction of motion due to the fact that one side of the belt contacts with a side of the belt groove in advance of the other side and, as high friction prevents slippage, the belt rolls over.

It has also been found in the manufacture of belts containing exposed rubber composition, that it is difficult to feed such belts to forming or guiding pulley grooves because of resistance to seating and tendency to turn over because of adhesion to the pulley.

The present invention aims to overcome the foregoing and other difficulties.

The principal objects of the invention are to reduce seating friction, to provide greater driving power, to prevent turning of belts in the groove, to reduce belt wear, and to provide an improved pulley construction.

These and other objects will appear from the following description and the accompanying drawing.

Of the drawing,

Fig. 1 is a side elevation of a pulley constructed according to and embodying the invention with a portion of a belt, other portions of the belt being broken away.

Fig. 2 is a cross-section thereof taken on line 2—2 of Fig. 1.

Fig. 3 is a detail perspective view showing a section of the pulley rim with the rollers in place, other parts being broken away.

In accordance with the invention, the pulley is formed with a belt receiving groove, the sides of which comprise surface elements movable toward and away from the axis of the pulley, preferably through rotation of the surface elements, so that a minimum amount of seating friction is developed while movement of the elements circumferentially of the wheel is restricted.

Referring to the drawing, the wheel 10 has a hub 11 and a rim 12 held in relation thereto by a web 13, spokes, or other means. The rim has a cylindrical peripheral surface 14 for underlying a belt 15, which belt is of trapezoidal cross-section and may be of the V-belt type or the hexagonal type shown in broken lines at 15'. At each side of the surface 14 are a circumferential series of retaining means such as ears 16, 17 which project laterally and radially beyond the face 14 and are formed with apertures 18, 19 to receive bearing means such as pins 20 which enter circumferentially successive apertures with their axes tangential to a circle concentric with the wheel and span the spaces between the ears.

Rotatably mounted on the pins 20 between the adjacent ears, are anti-friction belt-engaging means, preferably in the form of cylindrical rollers 21, 22 whose cylindrical faces extend beyond the ears and collectively define the sides of a belt receiving groove. The apertures 18, 19 may initially be formed as slots to permit entrance of the pins by movement laterally away from the center of the belt groove and the ears may then be deformed by peening or bending the material adjacent the apertures to clamp the pins in place or other retaining means may be provided. The rollers are freely rotatable about the bearing pins and within the slots provided between the successive ears and the series of rollers at opposite sides of the belt groove are spaced from each other so that when their rollers are tangent to the side faces of the belt the cylindrical surface 14 of the wheel will clear the bottom surface of the belt. With such an arrangement, the belt on progressively entering the groove will roll into place with very little friction and will wedge firmly between the series of rollers and clear of the bottom of the groove, a condition conducive to transmission of power without slippage.

When it is desired to have the belt bottom on the cylindrical wheel surface 14, as where the pulley is used as a forming wheel in building V-belts, the rollers may be spaced farther apart accordingly.

While the rollers 21, 22 have been shown with plain cylindrical surfaces, these surfaces may have curved faces for distributing the load and may be circumferentially grooved or knurled to provide greater resistance to slipping without substantially increasing loss of power due to friction of seating and unseating the belt. The margins of the rollers may be rounded, as shown, to prevent cutting of the belt. While the circumferential grooves increase the holding power circumferentially of the pulley, they seat and unseat the belt by rolling movement and therefore offer only small resistance to movement of the belt relative to the pulley in a direction radial of the pulley.

Where the pulley is used for transmission of power, as the belt progressively enters the groove of the pulley it rotates the rollers radially of the pulley and this makes lateral turning of the belt less likely.

In the manufacture of belts, the pulley may be used to support unvulcanized belt bodies having a tacky surface, as entry of the belt into the groove is facilitated without lateral turning due to the rotation of the rollers when contacted by the tacky material.

Variations may be made without departing from the scope of the invention as it is defined by the following claims.

I claim:

1. A pulley having rows of rotatable V-belt-engaging elements about its periphery presenting their rotatable surfaces as the sides of a belt-engaging groove, said elements being circular in section and being restrained to rotation about axes extending generally in the circumferential direction of the pulley.

2. A pulley having axially spaced-apart series of cylindrical rollers about its periphery presenting their surfaces as the sides of a belt-engaging groove, said elements being circular in section and being restrained to rotation about axes extending generally in the circumferential direction of the pulley.

3. A pulley having axially spaced-apart series of knurled cylindrical rollers about its periphery presenting their surfaces as the sides of a belt-engaging groove, said rollers having their groove-defining surfaces movable about axes extending generally in the circumferential direction of the pulley.

4. A pulley having axially spaced-apart series of cylindrical rollers about its periphery presenting their surfaces as the sides of a belt-engaging groove, said rollers having their groove-defining faces movable with relation to the pulley in a direction toward and from the axis of the pulley and rollers of the spaced-apart series being in axially opposed relation.

5. A pulley having axially spaced-apart series of anti-friction rollers about its periphery presenting their surfaces as the sides of a belt-engaging groove, said rollers being circular in cross section and having their axes restrained to positions tangent to circles concentric with the wheel.

6. A pulley having a peripheral channel for the reception of a belt of trapezoidal section, said pulley having in the side walls of the channel belt-contacting rotatable elements of circular cross section having peripheral surfaces rotatably movable toward and away from the axis of the pulley during seating and unseating of the belt.

WILLIAM B. COLLIER.